J. BETHENOD.
MEANS FOR REGULATING THE SPEED OF ASYNCHRONOUS OR INDUCTION MOTORS.
APPLICATION FILED JULY 18, 1911.
1,088,517.
Patented Feb. 24, 1914.
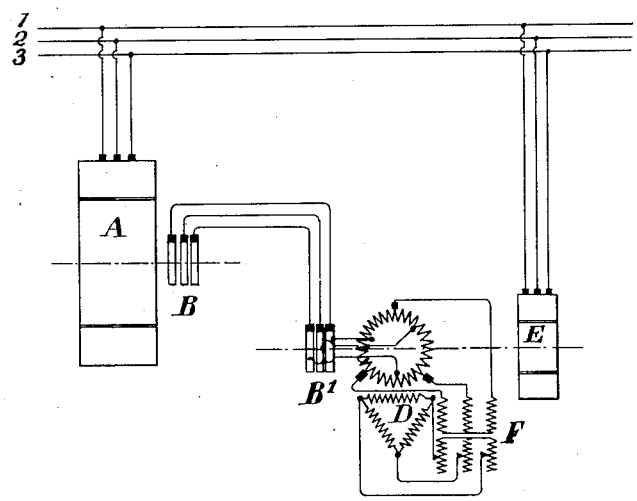

UNITED STATES PATENT OFFICE.

JOSEPH BETHENOD, OF PARIS, FRANCE, ASSIGNOR TO SOCIÉTÉ ALSACIENNE DE CONSTRUCTIONS MECANIQUES, OF BELFORT, FRANCE.

MEANS FOR REGULATING THE SPEED OF ASYNCHRONOUS OR INDUCTION MOTORS.

1,088,517.

Specification of Letters Patent. Patented Feb. 24, 1914.

Application filed July 18, 1911. Serial No. 639,107.

*To all whom it may concern:*

Be it known that I, JOSEPH BETHENOD, a citizen of the French Republic, and resident of Paris, France, have invented certain new and useful Means for Regulating the Speed of Asynchronous or Induction Motors, of which the following is a specification.

This invention relates to means for regulating the speed of induction or asynchronous motors in a manner to prevent any loss of power in the motor.

We are aware that with the same object in view, it has been proposed to use polyphase commutator machines which are mechanically coupled with a second auxiliary machine connected to the mains of the motor to be regulated. The commutator machine is connected with the rings of the rotor of the motor to be regulated, and the group of the two regulating machines restores the electric power received from the rotor to the mains, thus permitting of regulating the number of revolutions of the main motor without any loss of power. One of the drawbacks of said method is that the commutator machine, is traversed by an alternate current whose frequency is equal to that of the slip of said motor. This frequency is thus always relatively small, and when the regulating group is to work in a sufficiently economic manner, one is induced to adopt for the commutator machine a very highly hypersynchronic speed. To obtain however a satisfactory commutation, one is induced to provide said machine with special contrivances such as projecting poles and auxiliary commutation poles, resistant connections between the sections of the rotor and the collector bars, etc.

The object of the present invention consists in providing a new means for transforming the energy exchanged between the mains and the rotor of the main motor, to eliminate, the drawbacks set forth hereinbefore and one which will permit the use of polyphase commutator machines of a normal type.

In the accompanying drawing: the figure represents one arrangement of the feed regulator, a shunt excitation being employed.

In the form of the device herein illustrated there is provided the main motor A through whose rotor coils flows current of low frequency. This main motor A is provided with rings B which are electrically connected with rings $B^1$ of a polyphase commutator machine D which is mechanically coupled with a machine E of any desired type, the latter being connected to the line wires 1, 2 and 3 which are also connected to the main motor A. It is to be understood that it is the speed of the main motor A which is to be regulated. It is readily understood that under this arrangement the group D E permits of exchanging electric energy as desired in the rotor of the motor A and the mains in spite of the difference of periodicity existing between those two sources of electric current; the commutator machine D being moreover influenced by current, the frequency of which is nearly the same as the frequency of the current flowing through the line wires, this being obtained by means of a suitable choice of pole numbers in the machines of the group. The said machine D may therefore belong to any normal type, its own slip being on the same order as the slip of the motor A. Moreover the machine B is shown as provided with a shunt excitation which is regulated by the transformer F. Now by the particular arrangement set up in this instance the commutator machine acts at the same time as a frequency converter; owing to the presence of the rings $B^1$. The frequency of the currents which flow between B and $B^1$ is regulated, either by the transformer F or by any other suitable means. Thus the desired variation of speed of the motor A is obtained and it may easily be seen that this motor possesses a shunt characteristic, or in other words that its speed remains substantially the same whatever may be the load.

Having now fully described my said invention, what I claim and desire to secure by Letters Patent, is:

The combination with an asynchronous motor and mains for feeding said motor; of a polyphase commutator machine acting as a frequency converter and an auxiliary machine fed by mains feeding the motor and mechanically coupled with said polyphase commutator machine, the rotor of said polyphase commutator machine being provided with rings connected with the rings of the motor to be regulated, the windings of the stator of said polyphase commutator machine being connected with the brushes rubbing on the commutator, whereby to secure a regulation having a shunt characteristic.

In testimony whereof I have hereunto set my hand in the presence of two witnesses.

JOSEPH BETHENOD.

Witnesses:
S. CRYENE,
SAVENNE DE CASILE.